(12) United States Patent
Rösth et al.

(10) Patent No.: US 11,987,160 B2
(45) Date of Patent: May 21, 2024

(54) CRANE, AND A METHOD OF A CRANE

(71) Applicant: Hiab AB, Kista (SE)

(72) Inventors: Marcus Rösth, Hudiksvall (SE); Pelle Gustafsson, Hudiksvall (SE)

(73) Assignee: Hiab AB, Kista (SE)

( * ) Notice: Subject to any disclaimer, the term of this patent is extended or adjusted under 35 U.S.C. 154(b) by 288 days.

(21) Appl. No.: 17/730,871

(22) Filed: Apr. 27, 2022

(65) Prior Publication Data

US 2022/0355719 A1    Nov. 10, 2022

(30) Foreign Application Priority Data

May 4, 2021    (EP) ..................... 21171984

(51) Int. Cl.
*B60P 1/54*    (2006.01)
*B66C 13/48*    (2006.01)

(52) U.S. Cl.
CPC ............ *B60P 1/5433* (2013.01); *B66C 13/48* (2013.01)

(58) Field of Classification Search
CPC .............................. B66C 13/48; B60P 1/5433
See application file for complete search history.

(56) References Cited

U.S. PATENT DOCUMENTS

| | | | |
|---|---|---|---|
| 8,056,674 B2 | 11/2011 | Bean et al. | |
| 11,554,939 B2* | 1/2023 | Bergmayr | H04W 4/38 |
| 2016/0032565 A1 | 2/2016 | Shimizu et al. | |
| 2020/0223671 A1* | 7/2020 | Bergmayr | B66C 13/40 |

FOREIGN PATENT DOCUMENTS

| | | |
|---|---|---|
| CN | 111501894 A | 8/2020 |
| JP | H07115824 B2 | 12/1995 |
| JP | 2011174494 A | 9/2011 |
| WO | 2019060937 A1 | 4/2019 |

OTHER PUBLICATIONS

European Patent Office Rule 114(2) notice of Third Party Observation in corresponding priority European Application No. 20210171984; provided by European Patent Office on Oct. 20, 2023.
Extended European Search Report (EESR) for priority European Application No. 21171984.4.

* cited by examiner

*Primary Examiner* — Michael R Mansen
*Assistant Examiner* — Juan J Campos, Jr.
(74) *Attorney, Agent, or Firm* — Renner, Otto, Boisselle, & Sklar, LLP

(57) ABSTRACT

A crane includes a control interface to receive an operating instruction defining a target position, and a controller to determine movements of crane components and to generate driving instructions to be applied to a system of hydraulic actuators. The controller estimates a pressure level of a required working pressure of a hydraulic pump of each of the hydraulic actuators for the determined movements, and compares the estimated pressure levels and identifies the hydraulic actuators as a high pressure function, or as a low pressure function, based on the comparisons. The controller determines a time period during a movement from a current position to a target position, in which only the hydraulic actuators identified as a high pressure function or as a low pressure function is/are activated, and generates driving instructions for the hydraulic actuators to perform the determined movements, including activation of the determined hydraulic actuators during the time period.

10 Claims, 3 Drawing Sheets

CRANE, AND A METHOD OF A CRANE

This application claims priority of European Application No. 21171984.4, filed May 4, 2021, the disclosure of which is hereby incorporated by reference.

TECHNICAL FIELD

The present disclosure relates to a crane and a method of a crane, and particularly a crane intended to work more energy efficient than presently used cranes which is advantageous if the crane is a hydraulic crane with an electric power source.

BACKGROUND

The invention relates to loader cranes with automatic functions for moving a crane arm to a predetermined position, and more specifically for planning a crane tip path that are used to determine energy efficient movements of the crane components to reach the predetermined position of a crane tip.

Path planners used for automatic crane movements today may use calculation schemes for determining a path and a target geometry of the crane components to reach a predetermined position for the crane tip. The calculation schemes may be set to choose the most energy efficient target geometry or path that ensures that the crane tip is moved to the predetermined position based on the current position and minimizing the active energy used to transfer from the current crane geometry to the new crane geometry.

In automatic crane movement schemes, several functions are usually operated concurrently, and it has been noted that much of the consumed energy by the system is not actively used for the movements but is waste energy as a side effect of the mechanism of the hydraulic system. This has a big impact on for example crane systems with an electric power source as it affects the available operation time of e.g. a battery or a fuel cell before recharging, or refilling with hydrogen, that drives the hydraulic pump.

If the waste energy is reduced, the operating lifetime in between charging of the battery may be improved, or smaller batteries may be used reducing the cost and weight of the system on the vehicle. An improved solution is hence needed addressing a way to reduce the waste.

In the following some patent documents in the technical field of controlling loading and unloading procedures of a crane will be identified and briefly discussed.

CN111501894A discloses a system of a loader mounted on a vehicle comprising a hydraulic actuator, sensor units to sense pressure of the hydraulic actuator, a hydraulic oil source having pump driven by a motor to provide pressure oil to the hydraulic actuator, a control panel to receive control instructions, a controller and an energy storage elemem. The controller controls the flow of pressure oil between the energy storage element and an oil supply path.

JP2011174494A discloses a device utilized for a mobile crane, wherein the device comprises an arm pivotally connected to the tip end portion of the boom, hydraulic control device including a hydraulic pump driven by an electric motor. The electric motor is further driven by a power supply. Further, the device comprises a hydraulic pressure sensor for detecting the hydraulic pressure of the hydraulic actuator and, a hydraulic control means for controlling the discharge pressure of the hydraulic pump by adjusting the magnitude of the power supplied to the electric motor by the power supply means is provided. By adjusting the differential pressure from the discharge pressure of the hydraulic pump, it is possible to switch between the power mode and the energy-saving mode.

WO2019060937A1 discloses an operating device for vehicle-mounted a loading crane, wherein the device comprises a boom, actuators, a crane controller, and sensors. The sensors detect hydraulic pressure of a hydraulic cylinder corresponding to the attachment arm. The sensor signals are provided to the crane controller, wherein the crane controller generates corresponding sensor data and controls the hydraulic actuators.

US20160032565A1 discloses a driving device for driving a hydraulic excavator having a boom, hydraulic actuators, and hydraulic pumps with selector valves, wherein the selector valves are controlled by a controller. By using the hydraulic pumps, it becomes possible to drive a boom cylinder, an arm cylinder, a bucket cylinder, a swivel mechanism, and traveling devices, simultaneously and independently with an energy-saving capability.

Although the known devices comprise energy saving capabilities there is still room for improvement, and the object of the present invention is to achieve an improved crane, and an improved method applied by the crane, where waste energy to perform a planned loading/unloading procedure is reduced.

SUMMARY

The above-mentioned object is achieved by the present invention according to the independent claims.

Preferred embodiments are set forth in the dependent claims.

The main purpose of the present invention is to save energy in crane applications using automatic functions by addressing the relationship between the waste energy and the working pressure and flow required by the active functions in the hydraulics system.

An automatic function is in this respect defined as automatically moving the crane tip between a start and an end position, in response to receiving an instruction defining a target position. The start position may e.g. be the current position and the end position a target position for a movement of a load. Furthermore, the concept may also be used in more complex movements with additional intermediate positions in between the start and end positions. This could be used to make sure that the crane tip follows a specific path or if there are more than one targets where e.g. the load carried by the crane, or to be carried by the crane, is adjusted (unloaded or loaded).

One main advantage by implementing the crane and the method according to the present invention is the energy saving which is obtained by reducing waste energy. This is a significant advantage especially for electrically operated cranes where less energy consumption results in longer use time for the customer between charging, or that a smaller, less costly battery may be used instead for obtaining the same usage time.

A further advantage is that the solution according to the present invention, does not require any extra sensors or other hardware, in that it is a pure software solution which means that it may be implemented in existing products and hardware.

According to the present invention, a crane controller is arranged to determine the movements of the crane components and to generate driving instructions to be applied by the system of hydraulic actuators of the crane boom system. The generated driving instructions are based on the determined movements to reach the received target position for the crane from the current position of the crane boom system. The current position of the crane boom system may be deduced from the received sensor signals of the sensor system. If the target position is a position of the crane tip then the crane controller may be further arranged to calculate a crane geometry of the crane components to match the position of the crane tip. This may be performed in accordance with methods known in the art.

In the solution according to the invention the crane controller is arranged to generate driving instructions for the hydraulic actuators which are adapted to decrease the waste energy of the hydraulic system, i.e. energy consumed but not used to actively move the crane components. The waste energy is not only unwanted because it increases the amount of energy that is needed for the system without performing any actual movements of the crane components, it is further a disadvantage in that it is dissipated as heat which increases the temperature of the hydraulic fluid in the system. The temperature increase degrades the quality of the hydraulic fluid and hence affects the service frequency of the system.

In order to decrease the waste energy in the hydraulic system the crane controller is arranged to estimate a pressure level of the required working pressure of the hydraulic pump of each of the hydraulic actuators for the determined movements of the crane components to reach the target position. The estimation is based on the generated sensor signals and/or predetermined operation conditions, as an example the determined angles of the crane booms may be used as well as current pressure levels and known parameters of the planned movements.

The crane controller then compares the estimated pressure levels within the group of hydraulic actuators to be used for the determined movements of the crane components, and identifies at least one of the hydraulic actuators as a high pressure function, or as a low pressure function.

The crane controller generates driving instructions for the hydraulic actuators to perform the determined movements of the crane components using the identified groups of estimated pressure levels. In its broadest scope the driving instructions are generated so that they, when executed, result in at least one time period during the movement from the current position to the target position, in which only the at least one of the hydraulic actuators identified as a high pressure function or only the at least one of the hydraulic actuators identified as a low pressure function is activated.

By ensuring that there is at least one time period when either the high pressure functions are activated or the low pressure functions are activated the waste energy is reduced. This as there is at least one time period where the high pressure demand of the high pressure functions will not cause waste energy induced by concurrently active functions with a lower pressure demand. Likewise, no waste energy will be added from the higher pressure demand of other functions during the time period when only the low pressure functions are active.

In a further embodiment the crane controller may be further arranged to estimate a required flow level of each of the hydraulic actuators for the determined movements of the crane components. The flow estimations ma e.g. be based on the generated sensor signals and/or predetermined operation conditions.

The estimated flow levels may be compared within the group of hydraulic actuators to be used for the determined movements of the crane components, and the at least one hydraulic actuator with the highest required flow may be identified as a high flow function. The generated driving instructions for the hydraulic actuators to perform the determined movements of the crane components may then be further arranged to, when executed, result in at least one time period during the movement from the current position to the target position, in which the required pressure level of the hydraulic actuator(s) identified as a high flow level function sets the working pressure of the hydraulic pump.

This is an advantage as a high flow function typically generates a lot of waste if combined with a function that has a higher estimated pressure level.

The control interface of a crane according to the invention may be further arranged to receive an instruction for the crane to enter an energy efficient operation mode, in response to enter into this energy efficient mode the crane controller may be arranged to perform the steps of estimating and comparing the working pressures, and optionally also the flows, and generating the driving instructions for the hydraulic actuators as described, above. This would give the operator of the crane system to decide when to apply the method according to the invention, and selectively operate the crane in a normal mode according to what is known in the art.

DETAILED DESCRIPTION

The crane and method will now be described in detail with references to the appended figures. Throughout the figures the same, or similar, items have the same reference signs. Moreover, the items and the figures are not necessarily to scale, emphasis instead being placed upon illustrating the principles of the invention.

When operating multiple functions of a crane at the same time, the function that requires the largest pressure determines the working pressure level of the hydraulic pump. This implies that there will be a waste component if also other crane functions, requiring a lower working pressure, are activated at the same time. The waste component will further be dependent on the flow requirement of the other crane functions, as the hydraulic power supplied to the system is further dependent on the flow of the hydraulic fluid. A portion of the consumed energy of the hydraulic system is hence waste, i.e. not used for moving the crane components, if operating multiple functions at the same time that are not matched in terms of working pressure and to some extent flow.

As can be seen in the examples discussed below with references to FIGS. 1-3, the waste energy may even be larger than the useful energy that is used tbr actually moving the crane components. This is due to the fact that if one function demands a high pressure, that high pressure will then be the system pressure for all functions. If a concurrently used crane function only requires low pressure but high flow, a large portion of waste energy will be the result.

Figure 1:
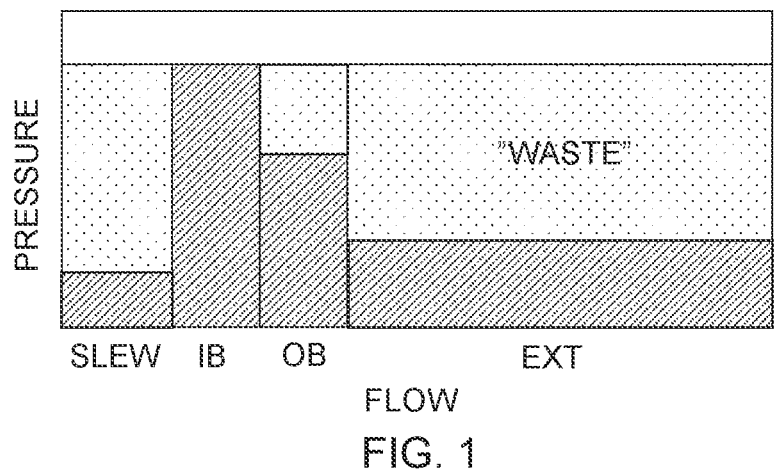
FIGS. 1-3 are graphs illustrating advantageous aspects of the present invention.
Figure 2:
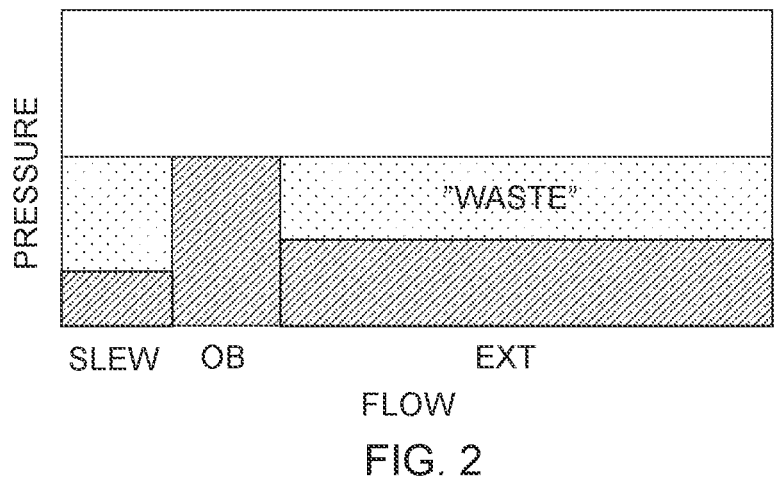
Figure 3:
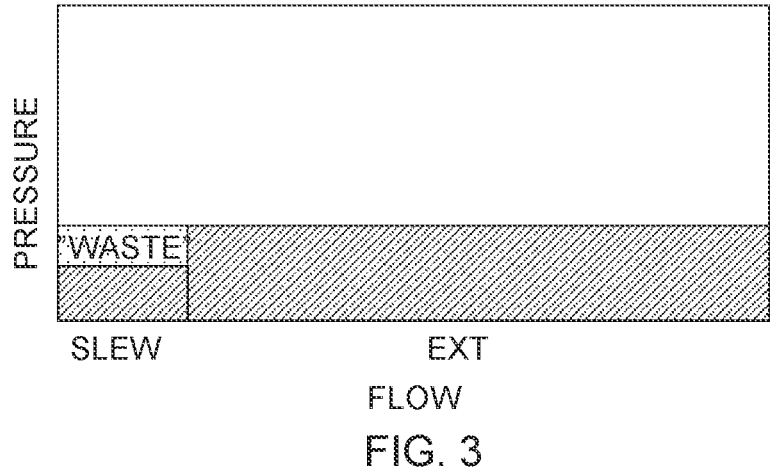

FIGS. 1-3 are graphs illustrating the energy consumption during use of an exemplary crane provided with an inner boom (IB), an outer boom (OB), and an extension (EXT). In the figures also the energy consumption during slewing (SLEW) is illustrated. The required energy for the movements is shown by dashed areas, and enery waste is shown by dotted areas. The consumed energy of the hydraulic system is the sum of the required energy for the movements and the waste energy. In the figures the Y-axis designates pressure and the X-axis designates flow.

In FIG. 1 an energy consumption graph is shown, where multiple crane functions are operated simultaneously. In FIG. 1, the inner boom (IB) requires high pressure and the extension (EXT) requires high flow but low pressure, then the waste energy for the extension function is larger than the amount of energy used for the actual movements.

This happens when all functions are simultaneously driven without taking waste energy into account.

In this example the total input is 49.6 kW, and the waste is 30.8 kW, i.e. the waste energy is 164.44% of the useful energy.

By not operating the inner boom (TB) function (which is the function requiring the highest pressure) at the same time as the slewing (SLEW), outer boom (OB) and extensions (EXT), the waste energy may be decreased from 30.8 kW to 1.2.9 kW in this specific example, see FIG. 2, where the inner boom (IB) is activated at another point in time and is not illustrated in FIG. 2. Here, the total energy input is 28.3 kW, and the waste energy is 12.9 kW, i.e. 83.78% of the useful energy.

The waste energy may be further decreased to 1.3 kW in another specific case, by also refraining from operating the outer boom (OB), see FIG. 3 (the outer boom function is hence not illustrated in FIG. 3 as it is activated individually at another point in time). In this case the total input energy is 14.2 kW, and the waste energy is 1.3 kW, i.e. 9.68% of the useful energy.

From these examples one can see that simultaneous use of a function with a high pressure demand and a function requiring a low pressure but a high flow should be avoided to reduce energy waste. For automatic crane functions where the target position of the crane tip, or the target geometry of the crane components, is known and the movements of individual crane functions are planned by a crane controller this aspect may be taken into account when planning the movement scheme to reach a target.

The energy supplied by the hydraulic pump to the crane system is dependent on the hydraulic power, which is calculated by the pressure multiplied by the flow supplied by the pump. The different hydraulic cylinders used for crane functions like the slewing of the crane, the first boom movement, the second boom movement and the extension/retraction of a second boom telescopic boom system, have different working requirements in terms of pressure and flow. The required pressure may further be dependent on the load and the position of the respective crane components but may be monitored using pressure sensors and further estimated for future movements based on input from the pressure sensors and/or known parameters of the planned movements.

The simplest version of an energy efficient path planner would be moving only one crane function at a time to reach the target angle or length to reach the target position or geometry. As an example, first slew, then the first boom, then the second boom, and then finish by moving the extensions. By doing so we would not get any energy waste at all. However, the time for completing the movement would be considerably longer than compared to the normal case with simultaneous multiple functions and the crane components would likely hit either the vehicle or some obstacles in the environment.

So to solve these issues, the path planner must be smarter, the easiest method is to move the known high pressure functions first, normally the first and the second boom which pressures can be assumed high, or measured.

Example on a path:

Use available flow to move first and second booms to its goal angles for reaching the target position, move slew as fast as possible to its goal angle, and at same time drive extension, but prioritize flow to slew to reach target as fast as possible, and move extension to target position.

To reach the target position it is likely that practical issues like the bending of the boom system etc. will require a slight repositioning of the crane tip close to target to reach it exactly. This may be performed as a final adjustment, or if these factors are known from the start, they may be further taken into consideration when planning the movements.

The above-described planner is a "simple" example of the planner to illustrate the concept of the present invention as defined by the appended claims. If this should be implemented in a product, more complex approach in the planner could further take into account effects of bending, pressures, flow needs, the distance from start to end position when planning a path which is as efficient as possible but not slowing down the crane.

Figure 4:
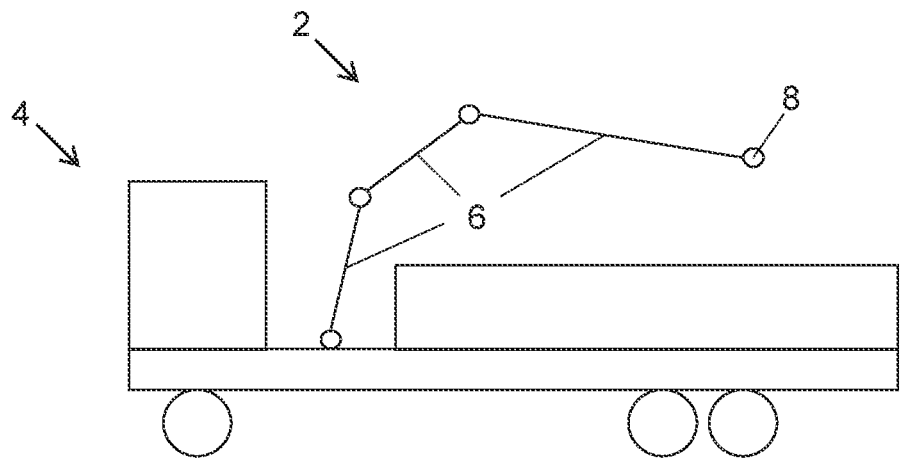
FIG. 4 is a schematic illustration of a vehicle provided with a crane according to the present invention.
Figure 5:
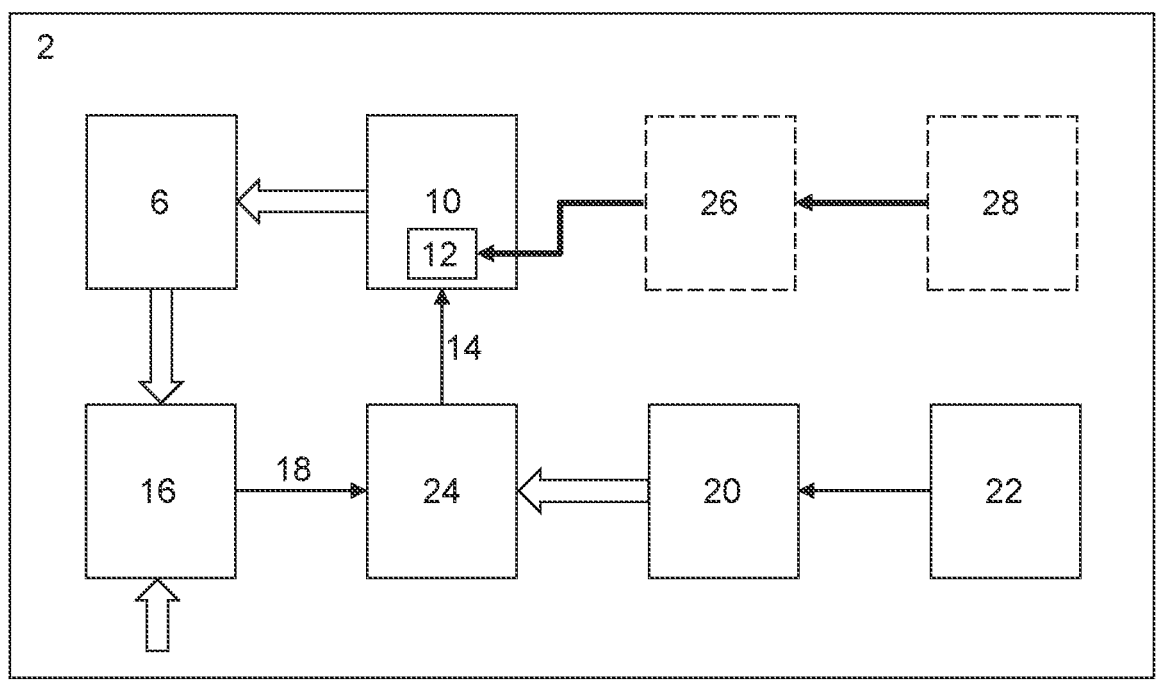
FIG. 5 is a schematic block diagram illustrating the crane according to the present invention.

With references to FIGS. 4 and 5, the present invention will now be described in detail. Thus, the present invention relates to a crane 2 arranged to be mounted to a vehicle 4. The crane comprises a crane boom system, comprising crane components 6 that includes a crane tip 8 arranged at a free end of an outermost crane boom.

Furthermore, the crane comprises a system 10 of hydraulic actuators of the crane boom system arranged to be operated by hydraulic fluid with a hydraulic flow, the hydraulic fluid being discharged from a hydraulic pump 12 at a variable working pressure. The hydraulic actuators are further arranged to apply movements to the crane boom system such that the crane tip 8 is moved from a current position to a target position in response to received driving instructions 14.

More particularly, the crane components 6 comprise a crane column arranged to rotate, or slew, around a vertical axis perpendicular to the plane of the vehicle, a first (inner) boom and a second (outer) telescopic boom with one or more extensions. Additional components, such as additional telescopic booms (also referred to as jibs) or crane tool may form part of the crane components.

The crane also comprises a sensor system 16 configured to monitor current positions of the crane components, and operating conditions of the system 10 of hydraulic actuators, and to generate sensor signals 18 in response to the monitored current positions and operating conditions.

Thus, the sensor system is configured to monitor current positions of the crane components, and comprises sensors arranged to measure e.g. an angle of a crane boom compared to a reference plane, or the extension length of the telescopic boom. The sensor system is also configured to monitor the operating conditions of the system of the hydraulic actuators and the hydraulic pump, and to generate sensor signals in response to measured pressures and flows at specific parts of the hydraulic system. The sensor system is hence used to monitor current positions and operating conditions of the crane.

In addition the crane comprises a control interface 20 arranged to receive an operating instruction from an input unit 22 defining a target position for the crane. The crane also comprises a crane controller 24 configured to determine the movements of the crane components 6 and to generate driving instructions 14 to be applied to the system 10 of hydraulic actuators of the crane boom system based on the determined movements to reach the received target position for the crane based on the current position of the crane boom system as defined by the received sensor signals 18 from the sensor system 16.

The operating instruction may comprise a signal indicating that an automatic movement or functionality of the crane should be initiated and may further identify a target position from a group of predefined target positions or identifying a specific target position, for example in terms of explicit coordinates or in relative movements compared to the current position for the crane tip or crane components. As a further alternative, the target position may be inherent from the signal indicating that the automatic movement or function of the crane should be initiated. The target position may be defined for the crane tip or be a target geometry for one or more of the crane components.

Thus, the control interface of the crane comprises an input unit 22, e.g. a maneuvering unit, used by an operator to operate the crane, remotely or at the site of the working assignment for the crane. The control interface of the crane may alternatively comprise an interface to an autonomous system controlling the crane and optionally also the vehicle that the crane is mounted to.

The crane controller 24 is further configured to estimate a pressure level of a required working pressure of the hydraulic pump 12 of each of the hydraulic actuators for the determined movements of the crane components 6, based on the generated sensor signals 18 and/or predetermined operating conditions, and to compare the estimated pressure levels of the hydraulic actuators to be used for the determined movements of the crane components.

The crane controller 24 is also configured to identify at least one of the hydraulic actuators as a high pressure function, or as a low pressure function, based on the comparisons of the estimated pressure levels of the hydraulic actuators to be used for the determined movements of the crane components 6.

The crane controller 24 is configured to determine at least one time period during the movement from the current position to the target position, in which only the at least one of the hydraulic actuators identified as a high pressure function or only the at least one of the hydraulic actuators identified as a low pressure function is/are activated.

The crane controller 24 is configured to generate driving instructions 14 for the hydraulic actuators to perform the determined movements of the crane components, including activation of the determined hydraulic actuators during the at least one time period.

The identification of a hydraulic actuator as a low or high pressure function may be made based on the difference in the estimated pressure levels to the other hydraulic actuators to be used for the determined movements of the crane components. The differences in pressure levels may as an example be compared to predetermined levels in order to identify a group of low pressure functions or high pressure functions, or both, Other groups of hydraulic functions may further be identified by comparing the estimated pressure levels. Within the identified groups the spreading in estimated pressure levels should preferably be as small as possible to ensure that the waste energy may be reduced or minimized.

By performing movements of the crane components identified as involved in for example a high pressure function, essentially all applied energy is used for the movement of crane components involved in that movement, as no other hydraulic actuators need to be activated.

According to an embodiment, the crane controller 24 is further configured to estimate a required flow level of each of the hydraulic actuators for the determined movements of the crane components 6, based on the generated sensor signals 18 and/or predetermined operation conditions. The crane controller 24 is then configured to compare the estimated flow levels of the hydraulic actuators to be used for the determined movements of the crane components 6, and to identify at least the hydraulic actuator with the highest required flow as a high flow function.

In addition, the crane controller 24 is further configured to determine and generate updated driving instructions 14 for the hydraulic actuators to perform the determined movements of the crane components 6 such that, when executed, the updated driving instructions 14 result in at least one time period during the movement from the current position to the target position, in which the required pressure level of the hydraulic actuator(s) identified as a high flow level function sets the working pressure of the hydraulic pump 12.

According to another embodiment, the control interface 20 is further arranged to receive an energy efficient mode instruction for the crane to enter an energy efficient operation mode. The crane controller 24 is then configured to perform the steps to estimate and compare the working pressures and to generate the driving instructions 14 for the hydraulic actuators dependent on identifying a low pressure, or a high pressure, function when receiving a target position for the crane, in response to receive to energy efficient mode instruction.

According to another embodiment, the crane comprises at least one electric motor 26 arranged to be powered by a battery system 28 and further being arranged to drive the hydraulic pump 12. The electrical energy from the battery system to the electric motor is illustrated by a bold arrow in FIG. 5, which also indicates the driving power to the hydraulic pump. As an alternative, the hydraulic pump is driven by a diesel engine on the vehicle.

According to still another embodiment, the received instruction defining a target position for the crane is a predetermined position for unloading or loading an object. The crane controller 24 is further arranged to determine a path for the crane tip 8 from the current position to the target position comprising at least one part where only the at least one of the hydraulic actuators identified as a high pressure function, or, only the at least one of the hydraulic actuators identified as a low pressure function, is required to be activated.

In another embodiment, the crane controller 24 comprises a machine learning algorithm, including a neural network trained to calculate the path based on the target position and the current position of the crane boom system.

According to the present invention a vehicle 4 is provided, that comprises a crane 2 as described above.

Figure 6:
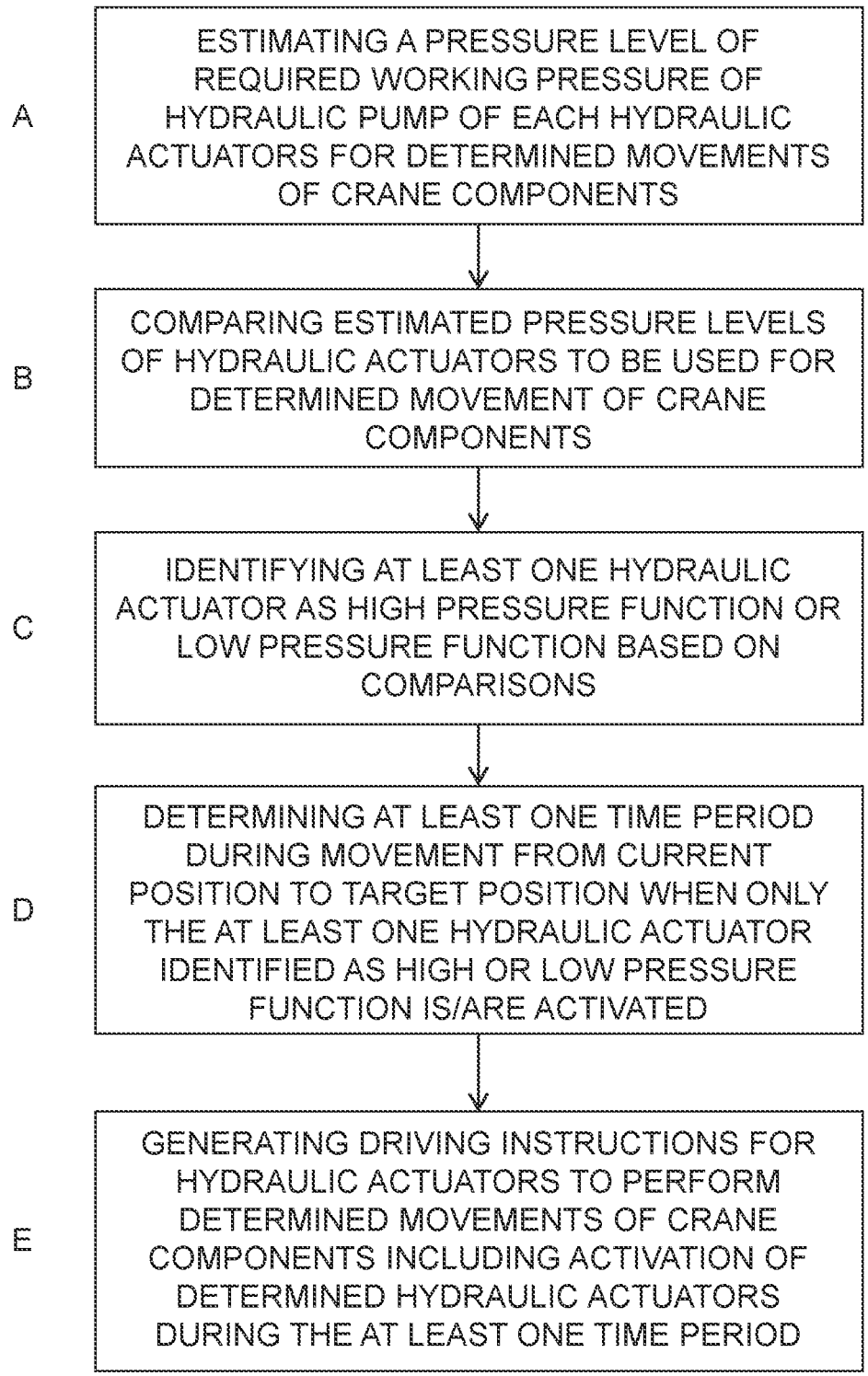
FIG. 6 is a flow diagram illustrating the method according to the present invention.

The present invention also relates to a method of a crane 2 arranged to be mounted to a vehicle 4. The crane has been described in detail above and it is herein referred to that description. The method will now be described with references to the flow diagram shown in FIG. 6.

Thus, the method comprises the following steps A-E:
A—estimating a pressure level of a required working pressure of the hydraulic pump of each of the hydraulic actuators for the determined movements of the crane components, based on the generated sensor signals and/or predetermined operating conditions, B—comparing the estimated pressure levels of the hydraulic actuators to be used for the determined movements of the crane components.

C—identifying at least one of the hydraulic actuators as a high pressure function, or as a low pressure function, based on the comparisons of the estimated pressure levels of the hydraulic actuators to be used for the determined movements of the crane components.

D—determining at least one time period during the movement from the current position to the target position, in which only the at least one of the hydraulic actuators identified as a high pressure function or only the at least one of the hydraulic actuators identified as a low pressure function is/are activated, and E—generating driving instructions for the hydraulic actuators to perform the determined movements of the crane components, including activation of the determined hydraulic actuators during said at least one time period.

In the following, some embodiments of the method are listed. These have the same technical features and advantages as for the corresponding crane described above. Consequently, these technical features and advantages are not repeated or explained anew in order to avoid unnecessary repetition.

According to an embodiment the method further comprises:
estimating a required flow level of each of the hydraulic actuators for the determined movements of the crane components, based on the generated sensor signals and/or predetermined operation conditions,
comparing the estimated flow levels of the hydraulic actuators to be used for the determined movements of the crane components,
identifying at least the hydraulic actuator with the highest required flow as a high flow function,
determining and generating updated driving instructions for the hydraulic actuators to perform the determined movements of the crane components such that, when executed, said updated driving instructions result in at least one time period during the movement from the current position to the target position, in which the required pressure level of the hydraulic actuator(s) identified as a high flow level function sets the working pressure of the hydraulic pump.

In another embodiment, the method further comprises:
receiving an energy efficient mode instruction for the crane to enter an energy efficient operation mode.
performing the steps to estimate and compare the working pressures and to generate the driving instructions for the hydraulic actuators dependent on identifying a low pressure, or a high pressure, function when receiving a target position for the crane, in response to receiving the energy efficient mode instruction.

In a further embodiment, the received instruction defining a target position for the crane is a predetermined position for unloading or loading an object. The method then further comprises:
determining a path for the crane tip from the current position to the target position comprising at least one part where only the at least one of the hydraulic actuators identified as a high pressure function, or, only the at least one of the hydraulic actuators identified as a low pressure function, is required to be activated.

In still another embodiment, the crane controller comprises a machine learning algorithm, including a neural network, and the method comprises training the neural network to calculate the path based on the target position and the current position of the crane boom system.

A test on an existing crane arranged on a vehicle was performed using two different paths; one sequence acting as existing "standard sequence" and one improved sequence applying the present invention ("improved sequence"). The result of the test is shown in table 1 below:

TABLE 1

| Standard sequence | Improved sequence |
| --- | --- |
| Start position is over the load bed (0 s) | Start position is over the load bed (0 s) |
| Slew out to side and lift a 800 kg load quite high (0-20 s) | Slew out to the side and lift a 800 kg load quite high (0-20 s) |
| | Reposition the boom system so inner and outer boom have correct angles for end position (20-34 s). |
| Extend the load to 90% of the extension system (ready time approx. 50 s). | Extend the load to 90% of the extension system by only using extension (34-50 s) |
| | Due to compression of oil the boom system needs repositioning (50-55 s) |
| Total time for standard sequence is 50 s | Total time for improved sequence is 55 s |
| Energy consumption for the standard sequence is 749 kWs = 0.21 kWh | Energy consumption for the improved sequence is 632 kWs = 0. 175 kWh |

The improved version consumes 0.033 kWh less (16%) hydraulic power into the valve, the efficiency of the electric machine and the pump is 70% so batter saving is 0.047 kWh (23%).

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A crane arranged to be mounted to a vehicle, the crane comprising:
a crane boom system, comprising crane components that includes a crane tip arranged at a free end of an outermost crane boom;
a system of hydraulic actuators of the crane boom system arranged to be operated by hydraulic fluid with a hydraulic flow, the hydraulic fluid being discharged from a hydraulic pump at a variable working pressure and wherein the hydraulic actuators are further arranged to apply movements to the crane boom system such that the crane tip is moved from a current position to a target position in response to received driving instructions;
a sensor system configured to monitor current positions of the crane components, and, operating conditions of the system of hydraulic actuators, and to generate sensor signals in response to the monitored current positions and operating conditions;
a control interface arranged to receive an operating instruction defining a target position for the crane, from an input unit, and
a crane controller configured to determine the movements of the crane components and to generate driving instructions to be applied to the system of hydraulic actuators of the crane boom system based on the determined movements to reach the received target position for the crane based on the current position of the crane boom system as defined by the received sensor signals from the sensor system, wherein the crane controller is further configured to estimate a pressure level of a required working pressure of the hydraulic pump of each of the hydraulic actuators for the determined movements of the crane components, based on the generated sensor signals and/or predetermined operating conditions, and to compare the estimated pressure levels of the hydraulic actuators to be used for the determined movements of the crane components, and to identify at least one of the hydraulic actuators as a high pressure function, or as a low pressure function, based on the comparisons of the estimated pressure levels of the hydraulic actuators to be used for the determined movements of the crane components, and that the crane controller is configured to determine at least one time period during the movement from the current position to the target position, in which only the at least one of the hydraulic actuators identified as a high pressure function or only the at least one of the hydraulic actuators identified as a low pressure function is/are activated, and wherein the crane controller is configured to generate driving instructions for the hydraulic actuators to perform the determined movements of the crane components, including activation of the determined hydraulic actuators during said at least one time period.

2. The crane according to claim 1, wherein the crane controller is further configured to estimate a required flow level of each of the hydraulic actuators for the determined movements of the crane components, based on the generated sensor signals and/or predetermined operation conditions, and to compare the estimated flow levels of the hydraulic actuators to be used for the determined movements of the crane components, and to identify at least the hydraulic actuator with the highest required flow as a high flow function, and wherein the crane controller is further configured to determine and generate updated driving instructions for the hydraulic actuators to perform the determined movements of the crane components such that, when executed, said updated driving instructions result in at least one time period during the movement from the current position to the target position, in which the required pressure level of the hydraulic actuator(s) identified as a high flow level function sets the working pressure of the hydraulic pump.

3. The crane according to claim 1, wherein the control interface is further arranged to receive an energy efficient mode instruction for the crane to enter an energy efficient operation mode and the crane controller is configured to perform the steps to estimate and compare the working pressures and to generate the driving instructions for the hydraulic actuators dependent on identifying a low pressure, or a high pressure, function when receiving a target position for the crane, in response to receive the energy efficient mode instruction.

4. The crane according to claim 1, further comprising at least one electric motor arranged to be powered by a battery system, or a fuel cell, and further being arranged to drive the hydraulic pump.

5. The crane according to of claim 1, wherein the received instruction defining a target position for the crane is a predetermined position for unloading or loading an object and the crane controller is further arranged to determine a path for the crane tip from the current position to the target position comprising at least one part where only the at least one of the hydraulic actuators identified as a high pressure function, or, only the at least one of the hydraulic actuators identified as a low pressure function, is required to be activated.

6. A vehicle comprising a crane according to claim 1.

7. A method of a crane arranged to be mounted to a vehicle, the crane comprising:

a crane boom system, comprising crane components that includes a crane tip arranged at a free end of an outermost crane boom;

a system of hydraulic actuators of the crane boom system arranged to be operated by hydraulic fluid with a hydraulic flow, the hydraulic fluid being discharged from a hydraulic pump at a variable working pressure and wherein the hydraulic actuators are further arranged to apply movements to the crane boom system such that the crane tip is moved from a current position to a target position in response to received driving instructions;

a sensor system configured to monitor current positions of the crane components, and, operating conditions of the system of hydraulic actuators, and to generate sensor signals in response to the monitored current positions and operating conditions;

a control interface arranged to receive an operating instruction defining a target position for the crane, from an input unit, and a crane controller configured to determine the movements of the crane components and to generate driving instructions to be applied to the system of hydraulic actuators of the crane boom system based on the determined movements to reach the received target position for the crane based on the current position of the crane boom system as defined by the received sensor signals from the sensor system, wherein the method comprises estimating a pressure level of a required working pressure of the hydraulic pump of each of the hydraulic actuators for the determined movements of the crane components, based on the generated sensor signals and/or predetermined operating conditions, comparing the estimated pressure levels of the hydraulic actuators to be used for the determined movements of the crane components, identifying at least one of the hydraulic actuators as a high pressure function, or as a low pressure function, based on the comparisons of the estimated pressure levels of the hydraulic actuators to be used for the determined movements of the crane components, determining at least one time period during the movement from the current position to the target position, in which only the at least one of the hydraulic actuators identified as a high pressure function or only the at least one of the hydraulic actuators identified as a low pressure function is/are activated, and generating driving instructions for the hydraulic actuators to perform the determined movements of the crane components, including activation of the determined hydraulic actuators during said at least one time period.

8. The method according to claim 7, wherein the method further comprises:

estimating a required flow level of each of the hydraulic actuators for the determined movements of the crane components, based on the generated sensor signals and/or predetermined operation conditions, comparing the estimated flow levels of the hydraulic actuators to be used for the determined movements of the crane components, identifying at least the hydraulic actuator with the highest required flow as a high flow function, determining and generating updated driving instructions for the hydraulic actuators to perform the determined movements of the crane components such that, when executed, said updated driving instructions result in at least one time period during the movement from the current position to the target position, in which the required pressure level of the hydraulic actuator(s) identified as a high flow level function sets the working pressure of the hydraulic pump.

9. The method according to claim 7, further comprising:
receiving an energy efficient mode instruction for the crane to enter an energy efficient operation mode,
performing the steps to estimate and compare the working pressures and to generate the driving instructions for the hydraulic actuators dependent on identifying a low pressure, or a high pressure, function when receiving a target position for the crane, in response to receiving the energy efficient mode instruction.

10. The method according to claim 7 wherein the received instruction defining a target position for the crane is a predetermined position for unloading or loading an object and the method further comprises:
determining a path for the crane tip from the current position to the target position comprising at least one part where only the at least one of the hydraulic actuators identified as a high pressure function, or, only the at least one of the hydraulic actuators identified as a low pressure function, is required to be activated.

* * * * *